(12) United States Patent
Chueh et al.

(10) Patent No.: US 8,248,980 B2
(45) Date of Patent: Aug. 21, 2012

(54) WIRELESS COMMUNICATION METHOD, TELECOMMUNICATION PROCESSING DEVICE AND TELECOMMUNICATION SYSTEM

(75) Inventors: Hsin-Ti Chueh, Taoyuan County (TW); Da-Jin Hsu, Taoyuan County (TW); Chia-Shiun Hsu, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 365 days.

(21) Appl. No.: 12/608,004

(22) Filed: Oct. 29, 2009

(65) Prior Publication Data

US 2010/0208652 A1 Aug. 19, 2010

(30) Foreign Application Priority Data

Feb. 13, 2009 (TW) .............................. 98104657 A

(51) Int. Cl.
*H04B 7/00* (2006.01)
(52) U.S. Cl. ........................................ 370/311; 370/328
(58) Field of Classification Search .................. 370/311, 370/328–338; 455/450–453
See application file for complete search history.

(56) References Cited

U.S. PATENT DOCUMENTS

2007/0149256 A1* 6/2007 Burgan et al. ................. 455/574
2009/0047946 A1* 2/2009 Sato et al. .................. 455/426.1

FOREIGN PATENT DOCUMENTS

WO 2007022005 2/2007
WO WO2007032107 * 3/2007

OTHER PUBLICATIONS

"Search Report of European Counterpart Application" issued on Feb. 9, 2010, p. 1-p. 6.

* cited by examiner

*Primary Examiner* — Pao Sinkantarakorn
(74) *Attorney, Agent, or Firm* — Jianq Chyun IP Office

(57) ABSTRACT

The invention provides a wireless communication method. The method comprises launching an application which requires a network service for a data transmission and generating a connection request. Then, a wireless communication function is turned on to implement a channel scan according to the connection request. When at least an access point of at least a wireless network is available, a network connection with the wireless network is established for the data transmission through the access point. When there is no available access point, the wireless communication function is terminated and a connection control mechanism is initiated. The connection control mechanism comprises forbidding re-turning on the wireless communication function within a connection suspension time and re-turning on the wireless communication function when the connection request is received after the connection suspension time.

15 Claims, 2 Drawing Sheets

WIRELESS COMMUNICATION METHOD, TELECOMMUNICATION PROCESSING DEVICE AND TELECOMMUNICATION SYSTEM

CROSS-REFERENCE TO RELATED APPLICATION

This application claims the priority benefit of Taiwan application serial No. 98104657, filed on Feb. 13, 2009. The entirety of the above-mentioned patent application is hereby incorporated by reference herein and made a part of this specification.

BACKGROUND OF THE INVENTION

1. Field of Invention

The present invention relates to a telecommunication method. More particularly, the present invention relates to a wireless communication method.

2. Description of Related Art

Currently, with the developments of the electronic technology and the telecommunication technology, a variety of the portable electronic equipments such as the cellular phone and personal digital assistant (PDA) has been developed continuously. During the continuous development of the telecommunication devices such as cellular phones, the functions of the telecommunication devices vary and further meet the human demands. In order to satisfy different user requirements, the multi-media cellular phone is developed to provide users the functions including sending emails, browsing webpages, taking pictures, filming video clips, listening music, watching video and transmitting video or text file.

However, when the user uses portable electronic device to connect to the Internet, it is usually to additionally and manually turn on the wireless communication function in order to search the access points of the wireless network around the user or to manually turn on the mobile communication function to connect the portable electronic device to the telecommunication station in order to connect to the Internet through the mobile communication network. The complicated operation procedure not only decrease the convenience of using the portable device to connect to the Internet but also consuming the time of the business men who only need to briefly connect to the Internet for searching data or receiving emails. Furthermore, when the user manually turns on the wireless communication function but there is no available access points of the wireless network, the user need to further manually turn off the wireless communication function for preventing the power consumption due to continuously channel scanning.

SUMMARY OF THE INVENTION

Accordingly, the present invention provides a wireless communication method capable of automatically connecting a portable device to the Internet without being manually operated by the user.

The present invention also provides a telecommunication processing device capable of increasing the convenience for operating the wireless communication function of the portable device.

The present invention further provides a telecommunication system capable of solving the power consumption problem due to repeatedly turning on and off the wireless communication function of the portable device.

To achieve these and other advantages and in accordance with the purpose of the invention, as embodied and broadly described herein, the invention provides a wireless communication method. The method comprises launching an application which requires a network service for a data transmission and generating a connection request. Then, a wireless communication function is turned on to implement a channel scan according to the connection request. When at least an access point of at least a wireless network is available, a network connection with the wireless network is established for the data transmission through the access point. When there is no available access point, the wireless communication function is terminated and a connection control mechanism is initiated. The connection control mechanism comprises forbidding re-turning on the wireless communication function within a connection suspension time and re-turning on the wireless communication function when the connection request is received after the connection suspension time.

According to one embedment of the invention, when there is no available access point, the data transmission is implemented through a mobile communication network. The mobile communication network includes a general packet radio service (GPRS) network.

According to one embedment of the invention, the connection suspension time is no less then 10 seconds.

The invention also provides a telecommunication processing device. The telecommunication processing device comprises a processor, a connection management module and a connection interface. The processor is used for operating an application to generate a connection request. The connection management module is used for turning on a wireless communication function to implement a channel scan according to the connection request. Furthermore, when at least an access point of at least a wireless network is available, a network connection between the processor and the wireless network is established by the connection interface accessing the wireless network through the access point for implementing a data transmission which is required for operating the application.

According to one embedment of the invention, the connection interface is used for implementing the data transmission through a mobile communication network when there is no available access point. The mobile communication network includes a general packet radio service (GPRS) network.

According to one embedment of the invention, the connection management module is used for monitoring a connection request receiving status while there is no available access point, and when the connection request receiving status shows there are consecutive received connection requests within a connection suspension time, the wireless communication function is forbad to be re-turned on. When the connection request receiving status shows there is at least a received connection requests after the connection suspension time, the wireless communication function is re-turned on. Moreover, the connection suspension time is no less then 10 seconds.

According to one embedment of the invention, the telecommunication processing device further comprising a display device and when the display device is turned-off, the display device is locked or the processor is turned-off, the network connection is terminated.

The invention further provides a telecommunication system. The telecommunication system comprises at least a wireless network, a mobile communication network and a portable device. The wireless network comprises a plurality of access points. The portable device comprises a processor, a connection management and a connection interface. The processor is used for operating an application to generate a connection request. The connection management module is used for turning on a wireless communication function to implement a channel scan according to the connection request. When at least one of the access points of the wireless network is available, a network connection between the processor and the wireless network is established by the connection interface accessing the wireless network through the access point for implementing a data transmission which is required for operating the application. When there is no available access point, the processor implements the data transmission through the mobile communication network.

According to one embedment of the invention, the mobile communication network includes a general packet radio service (GPRS) network.

According to one embedment of the invention, the connection management is further used for monitoring a connection request receiving status while there is no available access point, and when the connection request receiving status shows there are consecutive received connection requests within a connection suspension time, the wireless communication function is forbad to be re-turned on. When the connection request receiving status shows there is at least a received connection requests after the connection suspension time, the wireless communication function is re-turned on. Moreover, the connection suspension time is no less then 10 seconds.

According to one embedment of the invention, the portable device further comprises a display device, wherein when the display device is turned-off, the display device is locked or the processor is turned-off, the network connection is terminated.

In the present invention, launching an application requiring a network service is a trigger for the connection management module to automatically turn on the wireless communication function. Further, after the available access point of the wireless network is detected during the channel scan, the portable device connects to the Internet by the connection interface automatically accessing the wireless network through the access point so as to implement the required data transmission. Hence, it is unnecessary for the user to manually turn on the wireless communication function. On the other hand, when there is no available access point around, the processor of the portable device connects to the Internet by the connection interface automatically connecting to the mobile communication network for the data transmission. Again, it is unnecessary for the user to manually operate the network connection through the mobile communication network. Therefore, the connection operation procedure for connecting the portable device to the Internet is simplified and the convenience for the user to operate the portable device 106 is improved. Moreover, under the situation that there is no available access point around, the connection control mechanism is initiated to continuously monitor the connection request receiving status. In the connection suspension time, when a connection request is received, the connection control mechanism forbids re-turning on the wireless communication function. Consequently, the wireless communication function is prevent from being repeatedly turned on and off by receiving consecutive connection requests while there is no available access point around. Hence, the power consumption of the portable device due to repeatedly turning on and off the wireless communication function can be decreased.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
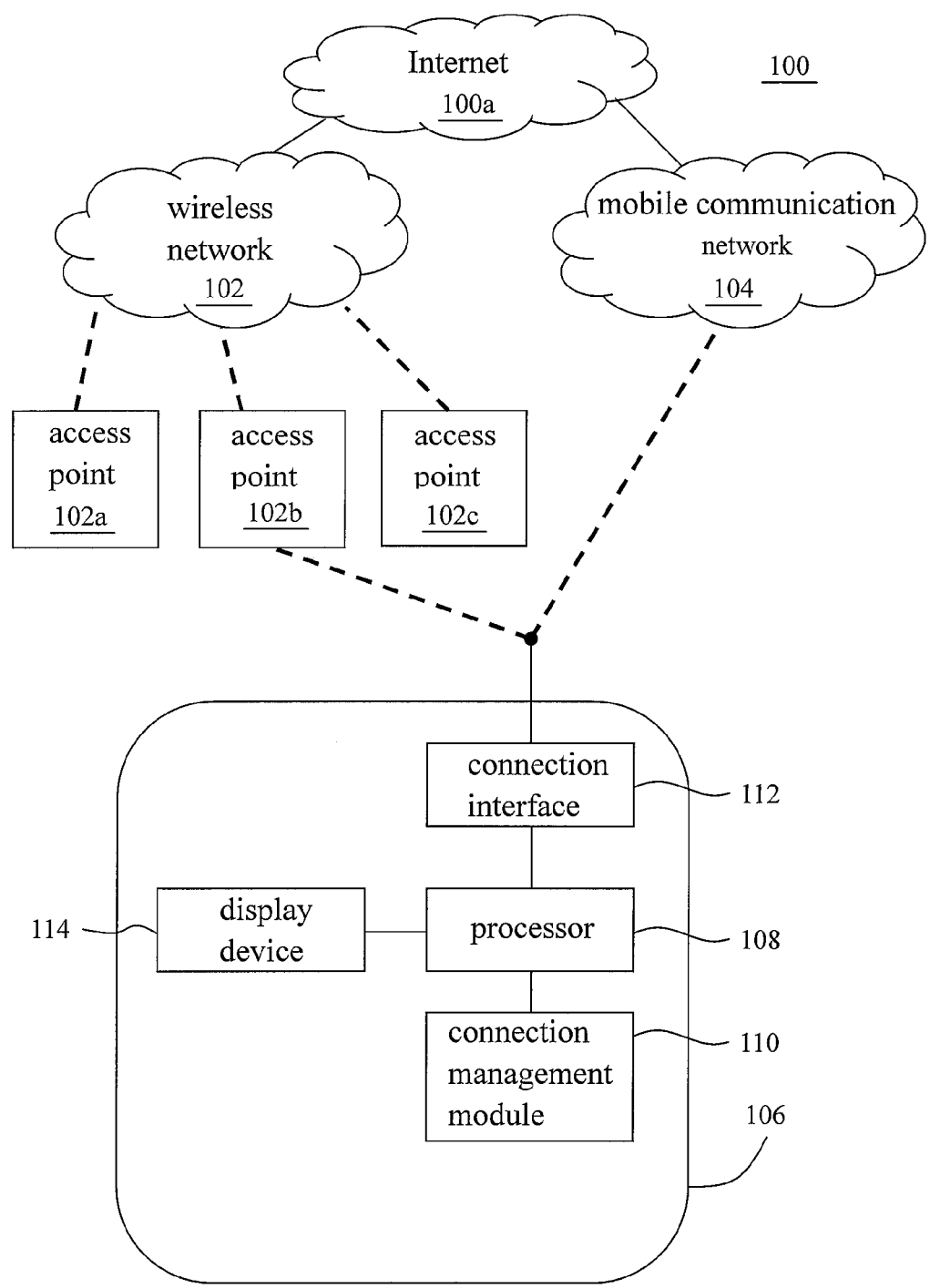
FIG. 1 is a block diagram schematically illustrating a telecommunication system according to one embodiment of the invention.
Figure 2:
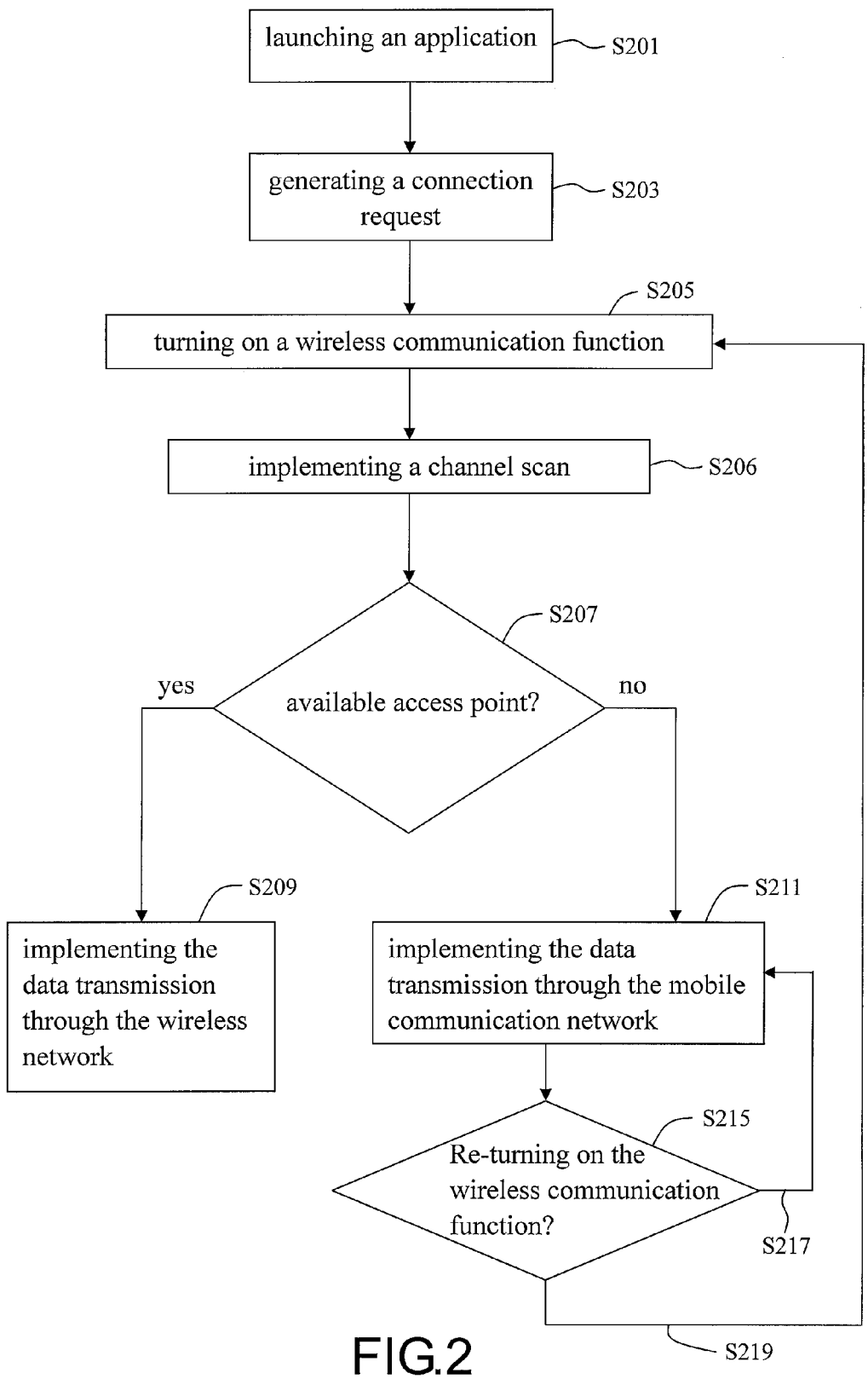
FIG. 2 is a flow chart showing a wireless communication method according to one embodiment of the invention.

FIG. 1 is a block diagram schematically illustrating a telecommunication system according to one embodiment of the invention. FIG. 2 is a flow chart showing a wireless communication method according to one embodiment of the invention. As shown in FIG. 1, a telecommunication system 100 comprises several wireless networks 102, several mobile communication networks 104 and a telecommunication processing device such as a potable device 106. The wireless networks 102 and the mobile communication networks 104 are coupled to the Internet 100a respectively. The wireless networks 102 can be, for example but not limited to, the wireless local area networks (WLANs) based on the IEEE 802.11 standards. Furthermore, each of the wireless networks 102 comprises several access points including access points 102a, 102b and 102c. Moreover, the mobile communication networks 104 can be, for example but not limited to, the general packet radio service (GPRS) networks which is capable of processing the packet transmission.

As shown in FIG. 1, the portable device 106 can be, for example but not limited to, the feature phone, the smart phone, the personal digital assistant (PDA), the PDA phone or the touch phone. The portable device 106 at least comprises a processor 108, a connection management module 110, a connection interface 112 and a display device 114.

As shown in FIG. 1 and FIG. 2, in the step S201, when the user operates the portable device 106 to launch an application installed in the portable device 106. The application can be, for example but not limited to, a web browser or other application having objects requiring the network service for implementing a data transmission. Further, when the processor 108 operates the application which requires the network service for implementing the data transmission, a connection request is generated (step S203). Taking the usage of the web browser as an exemplary example, when user opens a webpage by the web browser and the user click on a webpage address on the opened webpage to connect to or open another webpage, the processor 108 generates a connection request.

In the step S205, the connection management module 110 turns on a wireless communication function to implement a channel scan (step S206). It should be noticed that the aforementioned connection management module 110 can be, for example but not limited to, a computer readable and writable program capable of carry out the operation of connection management. Furthermore, the computer readable and writable program can be, for example, the connection management program within Microsoft Windows Operating System. In the step S207, it is determined whether there is at least an access point is available for the portable device 106. When at least one access point, such as the access point 102b shown in FIG. 1, of at least one wireless network 102 is detected to be available for the portable device 106, the processor 108 connects to the Internet 100a by the connection interface 112 accessing the wireless network 102 through the access point 102b so as to implement the required data transmission (step S209).

On the other hand, when there is no available access point around, in the step S211, the processor 108 connects to the Internet 100a to implement the data transmission through the connection interface 112 and the mobile communication network 104. The connection interface 112 comprises a wireless packet interface and a cell phone communication interface.

In addition, when there is no available access point around and therefore the wireless communication function is turned off, a connection control mechanism is initiated to determine whether the wireless communication function is re-turned on again (step S215). That is, within a connection suspension time right after the channel scan fails to detect at least one available access point around, the connection control mechanism forbids re-turning on the wireless communication function and maintains the data transmission between the portable device 106 and the Internet 100a through the mobile communication network 104 (step S217). Moreover, after the connection suspension time, when at least one connection request is received again, the wireless communication function is re-turned on to implement the channel scan again (step S219). The aforementioned connection suspension time is no less than 10 seconds.

On the other words, under the circumstance that there is no available access point around, after the processor 108 connects to the Internet 100a through the connection interface 112 and the mobile communication network 104 to implement the data transmission (step S211), the connection management module 110 initiates the connection control mechanism (step S215) for monitoring a connection request receiving status to determine whether the wireless communication function should be re-turned on. Therefore, within the connection suspension time, when the connection request receiving status shows that the connection requests are consecutively received, the connection management module refuses to re-turn on the wireless communication function and maintain the data transmission between the portable device 106 and the Internet 100a through the mobile communication network 104 (step S217).

If at least one connection request is received after the connection suspension time, the connection management module 110 re-turns on the wireless communication function (step S219) to implement the channel scan (step S206). Furthermore, the aforementioned connection suspension time is no less than 10 seconds.

Thereafter, when the user manually turns off or locks up the display device 114 of the portable device 106, or the portable device 106 automatically turns off or locks up the display device 114, or even the user manually turn off the portable device 106 or the portable device 106 automatically turns off itself (i.e. the processor 108 is turned off), the network connection between the portable device 106 and the Internet is terminated.

In the present invention, launching an application requiring a network service is a trigger for the connection management module 110 to automatically turn on the wireless communication function. Further, after the available access point 102b of the wireless network 102 is detected during the channel scan, the portable device 106 connects to the Internet 100a by the connection interface 112 automatically accessing the wireless network 102 through the access point 102b so as to implement the required data transmission. Hence, it is unnecessary for the user to manually turn on the wireless communication function. On the other hand, when there is no available access point around, the processor 108 of the portable device 106 connects to the Internet 100a by the connection interface 112 automatically connecting to the mobile communication network 104 for the data transmission. Again, it is unnecessary for the user to manually operate the network connection through the mobile communication network. Therefore, the connection operation procedure for connecting the portable device 106 to the Internet 100a is simplified and the convenience for the user to operate the portable device 106 is improved. Moreover, under the situation that there is no available access point around, the connection control mechanism is initiated to continuously monitor the connection request receiving status. In the connection suspension time, when a connection request is received, the connection control mechanism forbids re-turning on the wireless communication function. Consequently, the wireless communication function is prevent from being repeatedly turned on and off by receiving consecutive connection requests while there is no available access point around. Hence, the power consumption of the portable device due to repeatedly turning on and off the wireless communication function can be decreased.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A wireless communication method, comprising:
   launching an application which requires a network service for a data transmission;
   generating a connection request;
   turning on a wireless communication function to implement a channel scan according to the connection request;
   when at least an access point of at least a wireless network is available, establishing a network connection with the wireless network for the data transmission through the access point;
   when there is no available access point, terminating the wireless communication function and initiating a connection control mechanism to enter a connection suspension time, wherein the connection control mechanism comprises:
   while, within the connection suspension time, at least another connection request is continuously received after the connection request, forbidding re-turning on the wireless communication function; and
   re-turning on the wireless communication function when the connection request is received after the connection suspension time.

2. The method of claim 1, wherein, when there is no available access point, the data transmission is implemented through a mobile communication network.

3. The method of claim 2, wherein the mobile communication network includes a general packet radio service (GPRS) network.

4. The method of claim 1, wherein the connection suspension time is no less then 10 seconds.

5. A telecommunication processing device, comprising:
   a processor for operating an application to generate a connection request;
   a connection management module for turning on a wireless communication function to implement a channel scan according to the connection request, for turning off the wireless communication function while there is no available access point and for monitoring a connection request receiving status while there is no available access point, wherein when the connection request receiving status shows there are consecutive received connection requests within a connection suspension time, the connection management module forbids re-turning on the wireless communication function; and a connection interface, wherein, when at least an access point of at least a wireless network is available, a network connection between the processor and the wireless network is established by the connection interface accessing the wireless network through the access point for implementing a data transmission which is required for operating the application.

6. The telecommunication processing device of claim 5, wherein the connection interface is used for implementing the data transmission through a mobile communication network when there is no available access point.

7. The telecommunication processing device of claim 6, wherein the mobile communication network includes a general packet radio service (GPRS) network.

8. The telecommunication processing device of claim 5, wherein the connection management module is used for monitoring the connection request receiving status while there is no available access point, and when the connection request receiving status shows there is at least a received connection requests after the connection suspension time, the connection management module re-turns on the wireless communication function.

9. The telecommunication processing device of claim 5, wherein the connection suspension time is no less then 10 seconds.

10. The telecommunication processing device of claim 5 further comprising a display device, wherein when the display device is turned-off, the display device is locked or the processor is turned-off, the network connection is terminated.

11. A telecommunication system, comprising:
at least a wireless network, wherein the wireless network comprises a plurality of access points;
a mobile communication network;
a portable device, wherein the portable device comprises:
a processor for operating an application to generate a connection request;
a connection management module for turning on a wireless communication function to implement a channel scan according to the connection request, for turning off the wireless communication function while there is no available access point and for monitoring a connection request receiving status while there is no available access point, wherein when the connection request receiving status shows there are consecutive received connection requests within a connection suspension time, the connection management module forbids re-turning on the wireless communication function; and
a connection interface, wherein, when at least one of the access points of the wireless network is available, a network connection between the processor and the wireless network is established by the connection interface accessing the wireless network through the access point for implementing a data transmission which is required for operating the application and when there is no available access point, the processor implements the data transmission through the mobile communication network.

12. The telecommunication system of claim 11, wherein the mobile communication network includes a general packet radio service (GPRS) network.

13. The telecommunication system of claim 11, wherein the connection management is further used for monitoring the connection request receiving status while there is no available access point, when the connection request receiving status shows there is at least a received connection requests after the connection suspension time, the wireless communication function is re-turned on.

14. The telecommunication system of claim 11, wherein the connection suspension time is no less then 10 seconds.

15. The telecommunication system of claim 11, wherein the portable device further comprises a display device, wherein when the display device is turned-off, the display device is locked or the processor is turned-off, the network connection is terminated.

* * * * *